US009421510B2

(12) United States Patent
Winter

(10) Patent No.: US 9,421,510 B2
(45) Date of Patent: Aug. 23, 2016

(54) GASIFIER GRID COOLING SAFETY SYSTEM AND METHODS

(71) Applicant: SYNTHESIS ENERGY SYSTEMS, INC., Houston, TX (US)

(72) Inventor: John D. Winter, Houston, TX (US)

(73) Assignee: SYNTHESIS ENERGY SYSTEMS, INC., Houston, TX (US)

( * ) Notice: Subject to any disclaimer, the term of this patent is extended or adjusted under 35 U.S.C. 154(b) by 263 days.

(21) Appl. No.: 14/210,439

(22) Filed: Mar. 14, 2014

(65) Prior Publication Data

US 2014/0311701 A1    Oct. 23, 2014

Related U.S. Application Data

(60) Provisional application No. 61/803,439, filed on Mar. 19, 2013.

(51) Int. Cl.

| | | |
|---|---|---|
| *B01J 8/18* | (2006.01) | |
| *F23N 5/10* | (2006.01) | |
| *B01J 8/44* | (2006.01) | |
| *B01J 8/24* | (2006.01) | |
| *F23C 10/20* | (2006.01) | |
| *F23N 5/24* | (2006.01) | |

(52) U.S. Cl.
CPC .................. *B01J 8/1836* (2013.01); *B01J 8/24* (2013.01); *B01J 8/44* (2013.01); *F23C 10/20* (2013.01); *F23N 5/242* (2013.01)

(58) Field of Classification Search
CPC combination set(s) only.
See application file for complete search history.

(56) References Cited

U.S. PATENT DOCUMENTS

| | | | | | |
|---|---|---|---|---|---|
| 3,925,024 | A | * | 12/1975 | Hollingsworth | B01J 8/44 165/104.16 |
| 4,058,069 | A | * | 11/1977 | Baing | F23C 10/18 110/244 |
| 4,226,830 | A | * | 10/1980 | Davis | B01J 8/1818 110/245 |
| 4,270,469 | A | * | 6/1981 | Gall | B01J 8/002 110/245 |
| 4,474,583 | A | * | 10/1984 | Chen | C10J 3/54 48/197 R |
| 4,565,136 | A | * | 1/1986 | Nakamura | F23C 10/20 110/245 |
| 4,813,179 | A | * | 3/1989 | Ribesse | C10J 3/26 414/213 |
| 4,968,325 | A | * | 11/1990 | Black | C10J 3/482 422/143 |
| 4,990,371 | A | * | 2/1991 | Dutta | B01J 2/006 427/213 |
| 5,064,623 | A | * | 11/1991 | Harandi | C07C 41/06 202/152 |
| 5,101,742 | A | * | 4/1992 | Sowards | F23G 7/12 110/245 |
| 5,158,449 | A | * | 10/1992 | Bryan | F23C 10/002 110/245 |
| 5,183,641 | A | * | 2/1993 | Isaksson | F23C 10/20 110/229 |
| 5,580,362 | A | * | 12/1996 | Manulescu | B01J 8/1836 48/128 |
| 5,961,946 | A | * | 10/1999 | Takegawa | C09C 1/482 423/449.7 |
| 6,298,579 | B1 | * | 10/2001 | Ichitani | B03B 4/00 209/154 |
| 6,682,705 | B1 | * | 1/2004 | Gross | B01J 8/1827 137/1 |
| 2007/0119387 | A1 | * | 5/2007 | Higgins | F23C 10/10 122/4 D |

* cited by examiner

*Primary Examiner* — Kaity Handal
(74) *Attorney, Agent, or Firm* — Kening Li; Miller Canfield

(57) ABSTRACT

An apparatus for cooling a gas distribution grid of fluidized bed gasifier and a method is provided in the present invention. The apparatus comprises a gas flow failure event detector for detecting a gasifying gas flow failure event, a flow control device for controlling the introduction of a flow stream of a liquid material into a spraying device placed in the plenum space of the gasifier, wherein the gas flow failure event detector is in signal connection with the flow control device, and a spraying device for spraying into the plenum space the liquid material as mist which evaporates and generates a positive pressure to cause through the gas distribution grid a flow which prevents the hot bed material from settling on the gas distribution grid.

20 Claims, 2 Drawing Sheets

GASIFIER GRID COOLING SAFETY SYSTEM AND METHODS

CROSS-REFERENCE TO RELATED APPLICATIONS

This application claims the benefit of U.S. Provisional Application No. 61/803,439, filed Mar. 19, 2013, which is incorporated by reference herein in its entirety.

FIELD OF THE INVENTION

The present invention relates to coal gasification using a fluidized bed reactor. More specifically, the invention relates to gasifier grid cooling safety systems and methods to provide safety for the gasifier grid.

BACKGROUND OF THE INVENTION

Fluid bed gasifiers for coal and other carboneous materials operate by having an oxygen containing gas pass through a grid into a bed of fluidized solids and the gas reacts with the carbon containing solids to generate syngas. A widely used system is the Synthesis Energy Systems fluidized bed gasifier ("SES gasifier"), described in e.g. U.S. patent application Ser. No. 13/532,769. The basic structure of an SES gasifier comprises a vessel housing a headspace above a fluidized bed of the solid materials being gasified, and below the bed a conical grid through which the gasifying medium is introduced at sufficient velocity to fluidize the solid materials in the gasifier. Carbonous feed stock, usually as small particles, is delivered just above the grid. Steam and oxidant (either air or oxygen) are delivered from under the grid to fluidize and partially oxidize the feed stock Immediately underneath the grid and above other structures which are usually one or more additional vessels for ash cooling and processing etc., is an empty "plenum" space.

These gasifiers operate at temperatures from 900° C. to 1200° C. To protect the mechanical integrity of the grid, gas flow through the grid must be constantly maintained as long as the bed solids remain above the temperature at which the metal in the grid begins to lose a significant amount of strength. This temperature can be anywhere from 600 to 800° C., depending on the grid materials. For SES U-gas technology the grid temperature typically needs to be maintained below 700-800° C. If this gas flow is lost, for example due to power failure, the hot bed material will settle on the grid and the grid may be destroyed or severely damaged.

In addition to simple power failure, other equipment failure may also cause the loss of the gasifying gas flow. For example, steam is the most commonly used gasifying gas flow sent through the grid, and the steam system may fail leading to a loss of steam pressure, causing devastating damage to the grid.

It is therefore highly desirable to maintain a cooling gas flow through the grid under conditions where the fluidizing gas flow is lost.

The fluidizing gas must be initially available at slightly above the gasifier operating pressure which can be as high as 6 bars. Yet maintaining such a cooling gas flow is challenging because of the volume of gasses required and the pressure required. Additionally, fluidizing gas must be available even with complete loss of electrical power. Under those conditions, it would not be practical to store a gas in sufficient volumes under sufficient pressure for use to cool the bed solids to a safe point. The use of an easily vaporizable liquid (e.g. liquefied nitrogen) is equally not practical. Both would be prohibitively expensive and complex, not the least because of the need for (1) equipment to pump the liquid through a vaporizer, and (2) emergency power generation for the pump, or fuel-operated direct drive pumps.

There is the further complication that the cooling and fluidization must be done in such a way as to not damage the grid material or the refractory lining usually used in the chamber under the grid. For example, simply spraying excess water onto the underside of the grid using diesel driven pumps is not permitted due to the thermal shock to the grid and water damage to the refractory lining of the chamber under the grid.

Therefore, there is a need for a solution to the above problem when fluidizing gas flow is lost.

SUMMARY OF THE INVENTION

As discussed above, under certain circumstances when power failure or other equipment failure occurs, maintaining the gasifying gas without other backwards is important to the gas distribution grid as well as the reliability of the overall gasifier system. The present invention provides a safety system which comprises a liquid spray mechanism in the plenum place. This spray mechanism is automatically activated if there is a loss of fluidizing gas flow, namely when a gasifying gas flow failure event has been detected. Liquid material (e.g. water) spayed as mist is immediately converted into vapor in the plenum space, and generates a positive pressure to cause a steam flow through the gas distribution grid. The steam flow generated can cool the hot bed material and prevent the hot bed material from settling on the gas distribution grid.

According to one aspect, the present invention provides an apparatus for cooling a gas distribution grid of a fluidized bed gasifier, wherein the fluidized bed gasifier comprises a vessel housing a headspace above a fluidized bed of solid materials being gasified, a gas distribution grid below the bed through which the gasifying gas flow is introduced to fluidize the solid materials in the gasifier and a plenum space underneath the gas distribution grid. The apparatus comprises a gas flow failure event detector for detecting a gasifying gas flow failure event, a flow control device for controlling the introduction of a flow stream of a liquid material into a spraying device placed in the plenum space when a gasifying gas flow failure event is detected, wherein the gas flow failure event detector is in signal connection with the flow control device, and a spraying device for spraying into the plenum space the liquid material as mist which evaporates and generates a positive pressure to cause, through the gas distribution grid, a flow which prevents the hot bed material from settling on the gas distribution grid.

In one embodiment, the flow control device stops the introduction of the flow stream into the plenum space when the gasifying gas flow failure event disappears.

In one embodiment, the gas flow failure event detector identifies the temperature of the gas distribution grid and recognizes a gasifying gas flow failure event if the temperature is at or above a first pre-set temperature value. The first pre-set temperature value is determined by a safe distance value from the melting temperature of the gas distribution grid.

In one embodiment, the gas flow failure event detector identifies the temperature above the gas distribution grid and recognizes a gasifying gas flow failure event if the temperature is at or above a second pre-set temperature value. The second pre-set temperature value is determined by a safe distance value from a temperature higher than the melting temperature of the gas distribution grid.

In one embodiment, the gas flow failure event detector identifies the pressure in the plenum and above the gas distribution grid, and recognizes a gasifying gas flow failure event if the pressure in the plenum is below a pre-set pressure value. The pre-set pressure value is determined by a pressure buffer zone higher than the pressure above the gas distribution grid.

In one embodiment, the gas flow failure event detector identifies the temperature of the gas distribution grid, the pressure in the plenum and the pressure above the gas distribution grid, and recognizes a gasifying gas flow failure event if the temperature is at or above a first pre-set temperature value as well as the pressure in the plenum is below a pre-set pressure value. The first pre-set temperature value is determined by a safe distance value from the melting temperature of the gas distribution grid, and the pre-set pressure value is determined by a pressure buffer zone higher than the pressure above the gas distribution grid.

In one embodiment, the flow control device controls the flow stream of the liquid material to the extent that the pressure in the plenum due to evaporation of the liquid material remains above the pressure above the gas distribution grid.

In one embodiment, the flow control device controls a water storage tank with a pump (e.g. diesel driven pump), from which the flow stream of the liquid material is introduced.

In one embodiment, the flow control device controls a pressure vessel with a gas pad in which the liquid material is held, and the gas pad at a pressure higher than the gasifier pressure such that the expanding gas in the gas pad will provide sufficient pressure to drive the liquid material.

In one embodiment, the liquid material is noncorrosive to the gasifier metallurgy and has a vapor pressure above the gasifier operating pressure at the maximum allowable temperature of the gas grid.

In one embodiment, the liquid material comprises water, nitrogen, carbon dioxide, propane.

According to another aspect of the present invention, some embodiment further provides a method for cooling a gas distribution grid of fluidized bed gasifier, wherein the fluidized bed gasifier comprises a vessel housing a headspace above a fluidized bed of the solid materials being gasified, a gas distribution grid below the bed through which the gasifying gas flow is introduced to fluidize the solid materials in the gasifier, and a plenum space underneath the gas distribution grid, the method comprising detecting a gasifying gas flow failure event, introducing a flow stream of a liquid material into the plenum space when a gasifying gas flow failure event is detected, spraying into the plenum space the liquid material as mist which evaporates and generates a positive pressure to cause, through the gas distribution grid, a flow which prevents the hot bed material from settling on the gas distribution grid.

In one embodiment, the method further comprises stopping the introduction of the flow stream into the plenum space when the gasifying gas flow failure event disappears.

In one embodiment, detecting a gasifying gas flow failure event comprises identifying the temperature of the gas distribution grid, and recognizing a gasifying gas flow failure event if the temperature is at or above a first pre-set temperature value. The first pre-set temperature value is determined by a safe distance value from the melting temperature of the gas distribution grid.

In one embodiment, detecting a gasifying gas flow failure event comprises identifying the temperature above the gas distribution grid, and recognizing a gasifying gas flow failure event if the temperature is at or above a second pre-set temperature value. The second pre-set temperature value is determined by a safe distance value from a temperature higher than the melting temperature of the gas distribution grid.

In one embodiment, detecting a gasifying gas flow failure event comprises identifying the pressure in the plenum and above the gas distribution grid, and recognizing a gasifying gas flow failure event if the pressure in the plenum is below a pre-set pressure value, in particular, if plenum pressure is not higher than the above grid pressure by a pre-set value. This value needs to ensure fluidization of the bed. The pre-set pressure value can be determined by a pressure buffer zone higher than the pressure above the gas distribution grid.

In one embodiment, detecting a gasifying gas flow failure event comprises identifying the temperature of the gas distribution grid, the pressure in the plenum and the pressure above the gas distribution grid, recognizing a gasifying gas flow failure event if the temperature is at or above a first pre-set temperature value as well as the pressure in the plenum is below a pre-set pressure value. The first pre-set temperature value is determined by a safe distance value from the melting temperature of the gas distribution grid, and the pre-set pressure value is determined by a pressure buffer zone higher than the pressure above the gas distribution grid.

In one embodiment, the control of the flow stream of the liquid material is to the extent that the pressure in the plenum due to evaporation of the liquid material remains above the pressure above the gas distribution grid.

In one embodiment, the liquid material is delivered by a water storage tank with a pump, e.g. a diesel driven pump.

In one embodiment, the liquid material is held in a pressure vessel with a gas pad at a pressure higher than the gasifier pressure such that the expanding gas in the gas pad would provide sufficient pressure to drive the liquid.

In one embodiment, the liquid material is noncorrosive to the gasifier metallurgy and/or that has a vapor pressure above the gasifier operating pressure at the maximum allowable temperature of the gas grid.

In one embodiment, the liquid material comprises water, nitrogen, carbon dioxide, propane.

BRIEF DESCRIPTION OF THE DRAWING

For the present disclosure to be easily understood and readily practiced, the present disclosure will now be described, for purposes of illustration and not limitation, in conjunction with the following figures.

DESCRIPTION OF THE INVENTION

Figure 1:
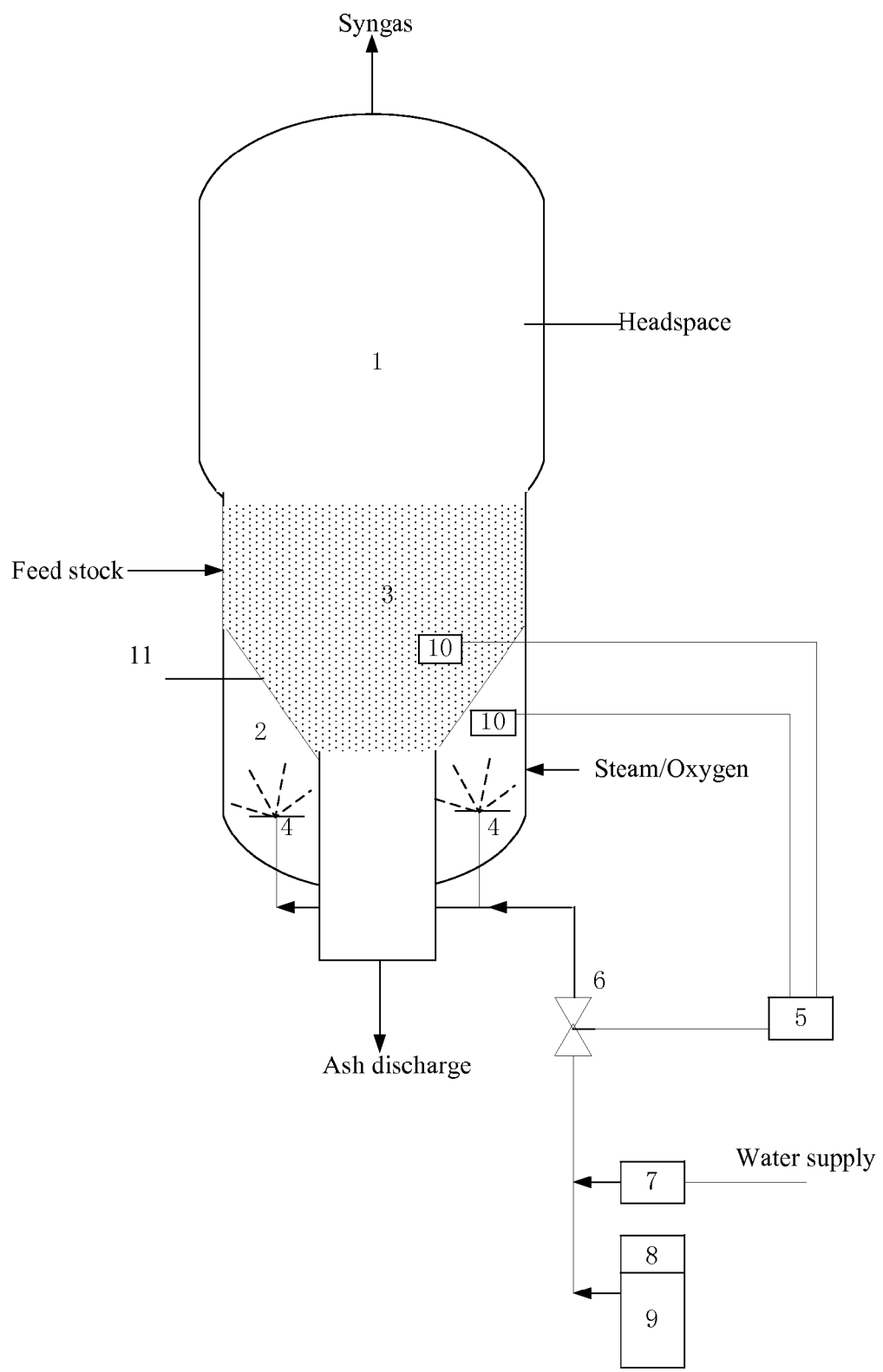
FIG. 1 schematically shows an exemplary overall arrangement of the apparatus for cooling a gas distribution grid of fluidized bed gasifier according to the present invention.

FIG. 1 schematically illustrates one embodiment of the present invention, showing a gasifier grid of a fluidized bed gasifier and a plenum space 2 underneath. The fluidized bed gasifier comprises a vessel housing a headspace 1 above a fluidized bed 3 of the solid materials being gasified and a gas distribution grid 11 below the bed through which the gasifying gas, such as steam and/or oxygen flow, is introduced to fluidize the feed stock in the gasifier and a plenum space 2 underneath the gas distribution grid 11. An ash discharge pipe is positioned at the bottom of the vessel. Carboneous feed stock such as coal is converted into syngas or synthesis gas primarily containing carbon monoxide (CO) and hydrogen ($H_2$) which is discharged from the top of the vessel.

The present invention provides a safety system which comprises a water spay mechanism in the plenum place 2. In one embodiment, the apparatus for cooling a gas distribution grid comprises one or more gas flow failure event detectors 10, a flow control device 5 and one or more spraying devices 4. The gas flow failure event detector 10 is for detecting a gasifying gas flow failure event. The flow control device 5 is for controlling the introduction of a flow stream of a liquid material into one or more spraying device 4 placed in the plenum space 2 when a gasifying gas flow failure event is detected. The gas flow failure event detector 10 is in signal connection with the flow control device 5.

One or more spraying devices 4 are for spraying the liquid material as mist which is immediately converted into the vapor phase due to evaporation in the plenum space, generating a positive pressure to cause a flow through the gas distribution grid 11 which prevents the hot bed material from settling on the gas distribution grid 11 and also cool the hot bed material in the fluidized bed 3.

A spraying device 4 may be a water supply apparatus which comprises means to disperse the water, such as spay nozzles, atomizing spay nozzles, microporous pipes, which for example may be made from sintered metal powder or fibers, pipes or other flow channels with drilled holes.

One or more water storage devices can be provided and connected via suitable pipe lines to the spraying device 4 inside the plenum space 2. This spray will be activated once a gasifying gas flow failure event is detected, when a loss of the fluidizing gas pressure in the plenum space 2 occurs, and when the temperature and pressure profile in the gasifier as well as the plenum is suitable for the spray to be activated and to continue.

In one embodiment of the apparatus, the flow control device 5 stops the introduction of the flow stream into the plenum space 2 when the gasifying gas flow failure event disappears.

The flow stream of a liquid material can be introduced to the spraying device 4 through a pipe or channel with a general valve 6. The flow control device 5 can be used to control open degree of the general valve 6 so as to control the introduction of a flow stream of a liquid material. The flow control device 5 may be a programmable logic controller. A variety of programming languages may be used to implement the flow control device 5.

The gasifying gas flow failure event can be detected in many ways. Since the gasifying gas flow from the distribution grid is used to cool the bed solids and also used to prevent the hot bed solids from settling on the gas distribution grid. If there is a failure of the gasifying gas flow, the temperature of gas distribution grid will be higher because of the hot bed solids in the bed or the hot bed solids which may fall down on the gas distribution grid. Accordingly, in some embodiment of the apparatus of the present invention, the gas flow failure event detector 10 identifies the temperature of the gas distribution grid and recognizes a gasifying gas flow failure event if the temperature is at or above a first pre-set temperature value.

The pre-set temperature value can be partially determined based on the melting temperature of the grid which mainly relates to the material of the grid. The temperature of gas distribution grid should be kept safely below the melting temperature of the grid and remain at a safe distance (such as 10° C., 20° C., 50° C. or 100° C.) from the melting temperature of the grid. As an example, if the melting temperature of the grid is marked as $T_M$, and the safe distance from $T_M$ is 50° C., and the temperature of the grid should not be higher than $T_M$ −50° C., thus, the first pre-set temperature value can be set to $T_M$ −50° C. The gas flow failure event detector 10 recognizes a gasifying gas flow failure event if the temperature of gas distribution grid is at or above $T_M$ −50° C.

As discussed above, the gasifying gas flow from the distribution grid is also used to cool the bed solids. The loss of gasifying gas flow, consequently, results in increase of the temperature of the gasifier or fluidized bed. Because the fluidized bed is above the grid, high temperature of the fluidized bed above the gas distribution unavoidably has an impact on the grid below. Accordingly, in some embodiment, the gas flow failure event detector 10 can identify the temperature above the gas distribution grid, and recognize a gasifying gas flow failure event if the temperature is at or above a second pre-set temperature value. Similarly, a second pre-set temperature value can also be determined based on the melting temperature of the grid. Since the temperature above the grid is not the grid temperate itself, the second pre-set temperature value may be higher ($T_A$) than a first pre-set temperature when considering a same safe distance. For example, if the melting temperature of the grid is marked as $T_M$, and the safe distance is 50° C., thus, the second pre-set temperature value can be set to $T_M+T_A-50°$ C. The second pre-set temperature value may be a temperature at which the gas distribute grid damaged e.g. 400° C. In this embodiment, the flow failure event detectors 10 may be one or more temperature sensors, arranged near or within the body or space being measured. The temperature sensor may be a thermocouple to convert the detected temperature value into electric signal. Sensors and other electrical controls will be provided as the gas flow failure event detector 10.

The water spray mechanism is activated if gasifying gas flow failure event has been detected. For example, the pressure in the plenum space 2 is lowered and approaching a value below or slightly above the operating pressure of the gasifier. Therefore, by monitoring the pressure in the plenum space 2 and the pressure in the gasifier, or monitoring the differential pressure between the plenum and gasifier headspace, the loss of fluidizing gas flow can be detected immediately. Accordingly, in some embodiment, the gas flow failure event detector 10 identifies the pressure in the plenum and above the gas distribution grid, and recognizes a gasifying gas flow failure event if the pressure in the plenum is lowered and approaching, or lower than a pre-set pressure value. The pre-set pressure value can be above or even lower than the pressure above the gas distribution grid or the operation pressure of the gasifier.

As shown in FIG. 1, the pressure of the steam flow from the grid 11 should be sufficient to lift the hot bed materials and ensure fluidization of the bed. Therefore, the pressure in the plenum space ($P_2$) should be at or above the pressure of the headspace 1 ($P_1$) and the pressure of the fluidized bed 3 ($P_3$) combined. That is to say, the pressure in the plenum space $P_2$ should not be lower than $P_1+P_3$ (i.e. $P_2 \geq P_1+P_3$) Moreover, a pressure buffer zone ($P_A$) for the plenum space pressure may be necessary for a safe operation. Therefore, the pre-set pressure value can be determined by the pressure buffer zone ($P_A$) higher than the pressure above the gas distribution grid ($P_1+P_3$). For example, the pre-set pressure value can be set to $P_1+P_3+P_A$. The plenum space $P_2$ should not be lower than $P_1+P_3+P_A$. (i.e. $P_2 \geq P_1+P_3+P_A$). The gas flow failure event detector 10 recognizes a gasifying gas flow failure event if the pressure in the plenum $P_2$ is lowered and approaching, or lower than a pre-set pressure value $P_1+P_3+P_A$.

The number of the gas flow failure event detectors 10 may be one or more pressure sensors, and arranged within the places being measured. For example, as shown in FIG. 1, two gas flow failure event detectors 10 are positioned within the gasifier bed region 3 and in the plenum space 2 respectively. In one embodiment of the apparatus, only one gas flow failure event detectors 10 is needed to monitor the pressure of the plenum space 2.

In some embodiment, the gasifying gas flow failure event can also be detected if the above conditions are met partially or in full, as long as the pressure and temperature are approaching some values that can reflect a loss of gasifying gas flow. As an example, the gas flow failure event detector 10 identifies the temperature of the gas distribution grid, the pressure in the plenum and the pressure above the gas distribution grid, and recognizes a gasifying gas flow failure event if the temperature is at or above a first pre-set temperature value as well as the pressure in the plenum is lowered and approaching a pre-set pressure value, which may be lower or slightly higher than the pressure above the gas distribution grid.

As discussed above, the flow control performed by the flow control device 5 may be accomplished by detecting or monitoring the pressure difference between the gasifier chamber (e.g. $P_1$, above the grid) and the plenum space (e.g. $P_2$, below the grid). If steam supply or other fluidization gas supply stops, a signal is generated to activate the spray, which may continue so long as the gasifying gas flow failure event continues, e.g. $P_1 > P_2$, and temperature at in the gasifier chamber being above e.g. 400° C. If $P_1 < P_2$, then flow control device 5 stops the spray, because it may mean that the temperature in the plenum is not high enough to generate steam with sufficient pressure to lift the hot bed materials above the grid, and a risk of liquid material accumulation is present.

The evaporation of the water would provide gas to fluidize the solids and keep them from settling directly onto the grid. The steam will also cool the bed solids. As the bed solids cool and the heat transfer from the bed to the grid to the plenum slows down, so would the cooling water.

As for the gasifying gas flow failure event, it should be noted that the foregoing description of the flow failure event in the embodiments has been presented for the purposes of illustration and description. It is not intended to be exhaustive or to limit the specification to the precise form disclosed. Many modifications and variations are possible in light of the above teaching. As long as the parameters of the gasifier can be used to identify a gasifying gas flow failure event, a gas flow failure event detector 10, which may be in various forms, can be placed in a proper position and used to detect the parameters and transmit the electric signal to the flow control device 5 so as to activate the spray.

In some embodiment, the flow control device 5 controls the flow stream of the liquid material to the extent that the pressure in the plenum space 2 due to evaporation of the liquid material remains above the pressure above the gas distribution grid 11.

In various ways the liquid material can be delivered in the plenum space 2. For example, in some embodiment, the water for spray could be delivered by a simple water storage tank as a water supply source with a diesel driven pump 7 similar to those used for fire water systems. The flow control device 5 can control the water storage tank with a diesel driven pump 7 from where the flow stream of the liquid material is introduced.

In some embodiment, as shown in FIG. 1 liquid material for the spray could be held in a pressure vessel 9 with a gas pad 8 at a pressure significantly higher than the gasifier pressure such that the expanding gas in the gas pad 8 would provide sufficient pressure to drive the liquid. Therefore, in some embodiment, the flow control device can control a pressure vessel with a gas pad 8 in which the liquid material is held, and the gas pad at a pressure higher than the gasifier pressure such that the expanding gas in the gas pad 8 will provide sufficient pressure to drive the liquid material.

In either case, no emergency power generation equipment is required. Since the fluidizing "gas" (i.e. steam) is being stored as a liquid at a far higher density than it has in the vapor state and it is only being converted to vapor in the plenum, the cooling/fluidizing media for the safety system needs far less storage volume than it would if it was stored as a gas.

The liquid material supply methods described above can be used together to provide the flow stream of the liquid material for spray.

Any material that is noncorrosive to the gasifier metallurgy and that has a vapor pressure above the gasifier operating pressure at the maximum allowable temperature of the gas grid could be used for the operating fluid of the liquid material in the safety system. For example, the liquid material may comprise water, nitrogen, carbon dioxide, propane etc.

The water spray is flow-controlled such that the pressure in the plenum due to evaporation of the water remains above the gasifier pressure, yet no free water exists at all or in any significant amount in the plenum chamber, to avoid any damage to the refractory lining. In contrast, conventional methods introduce liquid water directly and result in much water accumulation which damages the grid.

Figure 2:
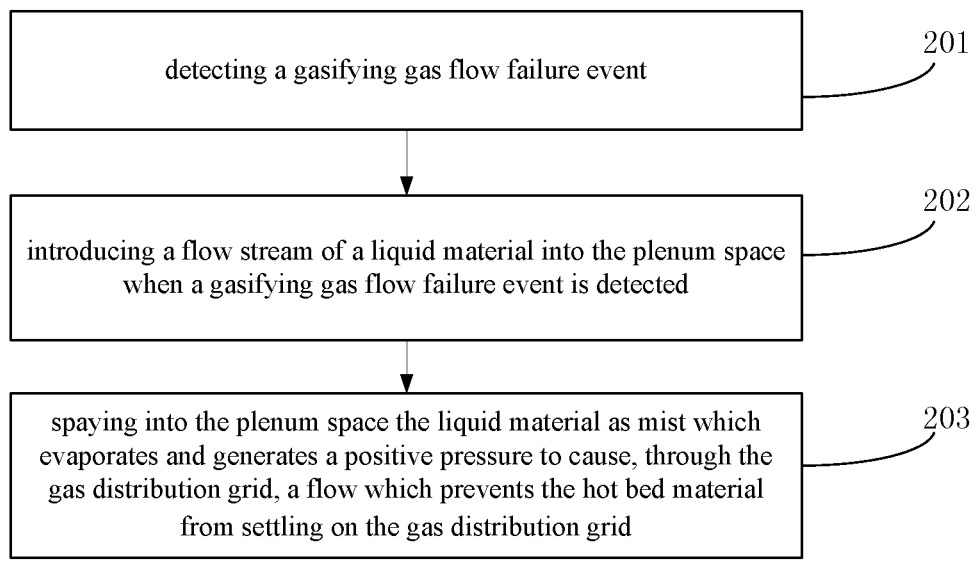
FIG. 2 illustrates a flowchart of one embodiment of a method for cooling a gas distribution grid of fluidized bed gasifier according to the present invention.

The present invention further provides a method for cooling a gas distribution grid of fluidized bed gasifier. The fluidized bed gasifier comprises a vessel housing a headspace above a fluidized bed of the solid materials being gasified, a gas distribution grid below the bed through which the gasifying gas flow is introduced to fluidize the solid materials in the gasifier and a plenum space underneath the gas distribution grid. Referring to FIG. 2, FIG. 2 illustrates a flowchart of one embodiment of a method for cooling a gas distribution grid according to the present invention. The method comprises 210 detecting a gasifying gas flow failure event, 202 introducing a flow stream of a liquid material into the plenum space when a gasifying gas flow failure event is detected, 203 spraying into the plenum space the liquid material as mist which evaporates and generates a positive pressure to cause, through the gas distribution grid, a flow which prevents the hot bed material from settling on the gas distribution grid.

In some embodiment, the method further comprises stopping the introduction of the flow stream into the plenum space when the gasifying gas flow failure event disappears.

In some embodiment, detecting a gasifying gas flow failure event comprises identifying the temperature of the gas distribution grid, and recognizing a gasifying gas flow failure event if the temperature is at or above a first pre-set temperature value. In some embodiment, detecting a gasifying gas flow failure event comprises identifying the temperature above the gas distribution grid, and recognizing a gasifying gas flow failure event if the temperature is at or above a second pre-set temperature value.

In some embodiment, detecting a gasifying gas flow failure event comprises identifying the pressure in the plenum and above the gas distribution grid, and recognizing a gasifying gas flow failure event if the pressure in the plenum is below a pre-set pressure value.

In some embodiment, detecting a gasifying gas flow failure event comprises identifying the temperature of the gas distribution grid, the pressure in the plenum and the pressure above the gas distribution grid, and recognizing a gasifying gas flow failure event if the temperature is at or above a first pre-set temperature value, the pressure in the plenum is below a pre-set pressure value.

In some embodiment, the control of the flow stream of the liquid material is to the extent that the pressure in the plenum due to evaporation of the liquid material remains above the pressure above the gas distribution grid.

In some embodiment, the liquid material is delivered by a water storage tank with a pump, such as diesel driven pump, which introduces the flow stream of the liquid material. In some embodiment, the liquid material is held in a pressure vessel with a gas pad at a pressure significantly higher than the gasifier pressure such that the expanding gas in the gas pad would provide sufficient pressure to drive the liquid.

The liquid material may be noncorrosive to the gasifier metallurgy and/or that has a vapor pressure above the gasifier operating pressure at the maximum allowable temperature of the gas grid. The liquid material may comprise water, nitrogen, carbon dioxide, propane.

It is understood that examples and embodiments described herein are for illustrative purpose only and that various modifications or changes in light thereof will be suggested to persons skilled in the art and are to be included within the spirit and purview of this application and scope of the appended claims. All publications, patents and patent applications cited in this patent are hereby incorporated by reference for all purposes.

The specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories, random access memories, EPROMs, EEPROMs, magnetic or optical cards, flash memories including USB keys with non-volatile memory or any type of media suitable for storing electronic instructions, each coupled to a computer system bus.

One or more features from any embodiment maybe combined with one or more features of any other embodiment without departing from the scope of the disclosure. The above description is illustrative and is not restrictive. Many variations of the invention will become apparent to those skilled in the art upon review of the disclosure. The scope of the invention should, therefore, be determined not with reference to the above description, but instead should be determined with reference to the claims along with their full scope or equivalents.

What is claimed is:

1. An apparatus for cooling a gas distribution grid of fluidized bed gasifier, wherein the fluidized bed gasifier comprises a vessel housing a headspace above a fluidized bed of solid materials being gasified, a gas distribution grid below the bed through which the gasifying gas flow is introduced to fluidize the solid materials in the gasifier, and a plenum space underneath the gas distribution grid, the apparatus comprising:

a gas flow failure event detector for detecting a gasifying gas flow failure event, which detector identifies the temperature of the gas distribution grid and recognizes a gasifying gas flow failure event if the temperature is at or above a first pre-set temperature value, and wherein the first pre-set temperature value is determined by a safe distance value from the melting temperature of the gas distribution grid, a flow control device for controlling the introduction of a flow stream of a liquid material into a spraying device placed in the plenum space when a gasifying gas flow failure event is detected, wherein the gas flow failure event detector is in signal connection with the flow control device, the spraying device for spraying into the plenum space the liquid material as mist which evaporates and generates a positive pressure to cause, through the gas distribution grid, a flow which prevents the hot bed material from settling on the gas distribution grid.

2. The apparatus according to claim 1, wherein the flow control device stops the introduction of the flow stream into the plenum space when the gasifying gas flow failure event disappears.

3. The apparatus according to claim 1, wherein the gas flow failure event detector identifies the temperature above the gas distribution grid and recognizes a gasifying gas flow failure event if the temperature is at or above a second pre-set temperature value, and wherein the second pre-set temperature value is determined by a safe distance value from a temperature higher than the melting temperature of the gas distribution grid.

4. The apparatus according to claim 1, wherein the gas flow failure event detector identifies the pressure in the plenum and above the gas distribution grid, and recognizes a gasifying gas flow failure event if the pressure in the plenum is below a pre-set pressure value, and wherein the pre-set pressure value is determined by a pressure buffer zone higher than the pressure above the gas distribution grid.

5. The apparatus according to claim 1, wherein the gas flow failure event detector identifies the temperature of the gas distribution grid, the pressure in the plenum and the pressure above the gas distribution grid, and recognizes a gasifying gas flow failure event if the temperature is at or above a first pre-set temperature value, the pressure in the plenum is below a pre-set pressure value, and wherein the first pre-set temperature value is determined by a safe distance value from the melting temperature of the gas distribution grid, and wherein the pre-set pressure value is determined by a pressure buffer zone higher than the pressure above the gas distribution grid.

6. The apparatus according to claim 1, wherein the flow control device controls the flow stream of the liquid material to the extent that the pressure in the plenum due to evaporation of the liquid material remains above the pressure above the gas distribution grid.

7. The apparatus according to claim 1, wherein the flow control device controls a water storage tank with a pump which introduces the flow stream of the liquid material.

8. The apparatus according to claim 1, wherein the flow control device controls a pressure vessel with a gas pad in which the liquid material is held, and the gas pad is at a pressure higher than the gasifier pressure.

9. The apparatus according to claim 1, wherein the liquid material is noncorrosive to the gasifier metallurgy and/or that has a vapor pressure above the gasifier operating pressure at the maximum allowable temperature of the gas grid.

10. The apparatus according to claim 1, wherein the liquid material comprises water, nitrogen, carbon dioxide, propane.

11. An method for cooling a gas distribution grid of fluidized bed gasifier, wherein the fluidized bed gasifier comprises a vessel housing a headspace above a fluidized bed of a solid materials being gasified, a gas distribution grid below the bed through which the gasifying gas flow is introduced to fluidize the solid materials in the gasifier, and a plenum space underneath the gas distribution grid, the method comprising:

detecting a gasifying gas flow failure event, wherein the detecting includes measuring the temperature of the gas distribution grid, recognizing a gasifying gas flow failure event if the temperature is at or above a first pre-set temperature value, wherein the first pre-set temperature value is determined by a safe distance value from the melting temperature of the gas distribution grid, introducing a flow stream of a liquid material into the plenum space when a gasifying gas flow failure event is detected, spraying into the plenum space the liquid material as mist which evaporates and generates a positive pressure to cause, through the gas distribution grid, a flow which prevents the hot bed material from settling on the gas distribution grid.

12. The method according to claim 11, further comprising stopping the introduction of the flow stream into the plenum space when the gasifying gas flow failure event disappears.

13. The method according to claim 11, wherein detecting a gasifying gas flow failure event comprises:

identifying the temperature above the gas distribution grid, recognizing a gasifying gas flow failure event if the temperature is at or above a second pre-set temperature value, wherein the second pre-set temperature value is determined by a safe distance value from a temperature higher than the melting temperature of the gas distribution grid.

14. The method according to claim 11, wherein detecting a gasifying gas flow failure event comprises:

identifying the pressure in the plenum and above the gas distribution grid, recognizing a gasifying gas flow failure event if the pressure in the plenum is lowered and approaching a pre-set pressure value, wherein the pre-set pressure value is determined by a pressure buffer zone higher than the pressure above the gas distribution grid.

15. The method according to claim 11, wherein detecting a gasifying gas flow failure event comprises:

identifying the temperature of the gas distribution grid, the pressure in the plenum and the pressure above the gas distribution grid, recognizing a gasifying gas flow failure event if the temperature is at or above a first pre-set temperature value, the pressure in the plenum is below a pre-set pressure value, wherein the first pre-set temperature value is determined by a safe distance value from the melting temperature of the gas distribution grid, and wherein the pre-set pressure value is determined by a pressure buffer zone higher than the pressure above the gas distribution grid.

16. The method according to claim 11, wherein the control of the flow stream of the liquid material is to the extent that the pressure in the plenum due to evaporation of the liquid material remains above the pressure above the gas distribution grid.

17. The method according to claim 11, wherein the liquid material is delivered by a water storage tank with a pump.

18. The method according to claim 11, wherein the liquid material is held in a pressure vessel with a gas pad at a pressure higher than the gasifier pressure.

19. The method according to claim 11, wherein the liquid material is noncorrosive to the gasifier metallurgy and/or that has a vapor pressure above the gasifier operating pressure at the maximum allowable temperature of the gas grid.

20. The method according to claim 11, wherein the liquid material comprises water, nitrogen, carbon dioxide, propane.

* * * * *